United States Patent
Zuo et al.

(10) Patent No.: US 11,572,079 B2
(45) Date of Patent: Feb. 7, 2023

(54) APPARATUS AND METHOD FOR CONTROLLING VELOCITY OF AUTONOMOUS DRIVING VEHICLE, AND STORAGE MEDIUM

(71) Applicant: WeRide Corp., Sunnyvale, CA (US)

(72) Inventors: Zhiyuan Zuo, Sunnyvale, CA (US); Albert Wu, Sunnyvale, CA (US); Qiu Jin, Sunnyvale, CA (US); Tianming Lu, Sunnyvale, CA (US); Zeyin Zhang, Sunnyvale, CA (US); Xuanzhu Lin, Sunnyvale, CA (US); Xiong Wu, Sunnyvale, CA (US); Yiqing Yang, Sunnyvale, CA (US); Hua Zhong, Sunnyvale, CA (US)

(73) Assignee: WERIDE CORP., San Jose, CA (US)

( * ) Notice: Subject to any disclaimer, the term of this patent is extended or adjusted under 35 U.S.C. 154(b) by 466 days.

(21) Appl. No.: 16/857,196

(22) Filed: Apr. 24, 2020

(65) Prior Publication Data
US 2020/0339153 A1    Oct. 29, 2020

Related U.S. Application Data

(60) Provisional application No. 62/838,346, filed on Apr. 25, 2019.

(51) Int. Cl.
*B60W 60/00*    (2020.01)
*B60W 30/02*    (2012.01)

(52) U.S. Cl.
CPC ...... *B60W 60/0011* (2020.02); *B60W 30/025* (2013.01); *B60W 60/0013* (2020.02);
(Continued)

(58) Field of Classification Search
CPC .................................................. B60W 60/0011
See application file for complete search history.

(56) References Cited

U.S. PATENT DOCUMENTS

| | | | | |
|---|---|---|---|---|
| 5,594,414 | A | * 1/1997 | Namngani | B60Q 9/008 340/904 |
| 5,680,118 | A | * 10/1997 | Cusumano | B60Q 1/52 340/904 |

(Continued)

FOREIGN PATENT DOCUMENTS

| | | | | |
|---|---|---|---|---|
| CN | 106197432 A | * 12/2016 | | G01C 21/20 |
| CN | 106218633 A | * 12/2016 | | |

(Continued)

*Primary Examiner* — Shelley Chen
(74) *Attorney, Agent, or Firm* — Jun He Law Offices P.C.; James J. Zhu (57) ABSTRACT

An apparatus and a method for controlling a velocity of an autonomous driving vehicle is provided. The method includes steps of: obtaining information of an environment surrounding the vehicle when an obstacle is detected to be on a planning path of the vehicle; obtaining an initial reference velocity profile of the vehicle; determining a safety factor based on the initial reference velocity profile, the information of the environment and information of the vehicle, wherein the safety factor at least comprises a safety distance between the vehicle and the obstacle for the vehicle to follow the obstacle; determining an optimized reference velocity profile based on the information of the environment, the information of the vehicle and the safety factor; and performing the step of determining the safety factor by using the optimized reference velocity profile as the initial reference velocity profile and the step of determining the optimized reference velocity iteratively.

18 Claims, 4 Drawing Sheets

(52) U.S. Cl.
CPC ..... *B60W 60/0016* (2020.02); *B60W 2520/10* (2013.01); *B60W 2520/12* (2013.01); *B60W 2554/20* (2020.02); *B60W 2554/40* (2020.02)

(56) References Cited

U.S. PATENT DOCUMENTS

| | | | | |
|---|---|---|---|---|
| 6,554,094 | B1* | 4/2003 | Bell | B62D 5/0418 |
| | | | | 152/416 |
| 7,706,979 | B1* | 4/2010 | Herwitz | G08G 5/0026 |
| | | | | 701/120 |
| 8,676,466 | B2* | 3/2014 | Mudalige | G08G 1/22 |
| | | | | 701/32.7 |
| 8,954,260 | B2* | 2/2015 | Gandhi | G08G 1/166 |
| | | | | 701/72 |
| 10,289,121 | B2* | 5/2019 | Turpin | G05D 1/102 |
| 10,387,813 | B2* | 8/2019 | Zhou | G06Q 10/063118 |
| 10,640,111 | B1* | 5/2020 | Gutmann | B60W 60/0015 |
| 10,864,910 | B2* | 12/2020 | Adam | G08G 1/166 |
| 11,091,162 | B2* | 8/2021 | Lindholm | G06K 9/6288 |
| 11,125,872 | B2* | 9/2021 | Stachnik | G01S 7/2921 |
| 11,353,589 | B2* | 6/2022 | Coombe | G05D 1/00 |
| 2011/0307175 | A1* | 12/2011 | Gandhi | G08G 1/166 |
| | | | | 701/301 |
| 2016/0009283 | A1* | 1/2016 | Tokimasa | B60W 30/14 |
| | | | | 701/96 |
| 2016/0232410 | A1* | 8/2016 | Kelly | G06V 10/42 |
| 2018/0060467 | A1* | 3/2018 | Schulte | B60W 30/0956 |
| 2018/0136669 | A1* | 5/2018 | Turpin | G05D 1/102 |
| 2018/0174458 | A1* | 6/2018 | Miller | G08G 1/166 |
| 2019/0219700 | A1* | 7/2019 | Coombe | G01S 7/4802 |
| 2019/0232964 | A1* | 8/2019 | Lindholm | G06V 20/58 |
| 2019/0295412 | A1* | 9/2019 | Grubwinkier | G08G 1/0141 |
| 2019/0351899 | A1* | 11/2019 | Adam | B60W 30/095 |
| 2019/0369228 | A1* | 12/2019 | Stachnik | G01S 13/931 |
| 2020/0139954 | A1* | 5/2020 | Wallstedt | B60W 10/18 |

FOREIGN PATENT DOCUMENTS

| | | | | |
|---|---|---|---|---|
| CN | 106843272 | A | * 6/2017 | |
| CN | 107014384 | A | * 8/2017 | ............ G01C 21/20 |
| CN | 107992051 | A | * 5/2018 | ............ G05D 1/0214 |
| CN | 108829131 | A | * 11/2018 | ............ G05D 1/104 |

* cited by examiner

APPARATUS AND METHOD FOR CONTROLLING VELOCITY OF AUTONOMOUS DRIVING VEHICLE, AND STORAGE MEDIUM

TECHNICAL FIELD

The present disclosure generally relates to autonomous driving vehicles, more particularly, to an apparatus and method for controlling a velocity of an autonomous driving vehicle, and a non-transitory computer-readable storage medium.

BACKGROUND

Autonomous driving is a relatively new technological field for automotive industry. With an autonomous driving system, vehicles are capable of sensing their environment and navigating without human operations. However, when an autonomous driving vehicle encounters a sudden change of a front obstacle's state, passengers in the autonomous driving vehicle may experience sudden acceleration or deceleration. This is due to the sudden jump of a velocity reference determined by the autonomous driving system, and may cause the passengers uncomfortable.

Thus, there is a need to improve the autonomous driving system.

SUMMARY

According to a first aspect of embodiments of the present disclosure, a method for controlling a velocity of an autonomous driving vehicle is provided. The method may include steps of: obtaining information of an environment surrounding the vehicle when an obstacle is detected to be on a planning path of the vehicle; obtaining an initial reference velocity profile of the vehicle; determining a safety factor based on the initial reference velocity profile, the information of the environment and information of the vehicle, wherein the safety factor at least includes a safety distance between the vehicle and the obstacle for the vehicle to follow the obstacle; determining an optimized reference velocity profile based on the information of the environment, the information of the vehicle and the safety factor; and performing the step of determining the safety factor by using the optimized reference velocity profile as the initial reference velocity profile and the step of determining the optimized reference velocity iteratively.

According to a second aspect of embodiments of the present disclosure, an apparatus for controlling a velocity of an autonomous driving vehicle is provided. The apparatus may include: a processor; and a memory for storing instructions executable by the processor; wherein the processor is configured to perform steps of: obtaining information of an environment surrounding the vehicle when an obstacle is detected to be on a planning path of the vehicle; obtaining an initial reference velocity profile of the vehicle; determining a safety factor based on the initial reference velocity profile, the information of the environment and information of the vehicle, wherein the safety factor at least includes a safety distance between the vehicle and the obstacle for the vehicle to follow the obstacle; determining an optimized reference velocity profile based on the information of the environment, the information of the vehicle and the safety factor; and performing the step of determining the safety factor by using the optimized reference velocity profile as the initial reference velocity profile and the step of determining the optimized reference velocity iteratively.

According to a third aspect of embodiments of the present disclosure, a non-transitory computer-readable storage medium is provided. The non-transitory computer-readable storage medium may have stored therein instructions that, when executed by a processor, cause the processor to perform a method for controlling a velocity of an autonomous driving vehicle, wherein the method includes steps of: obtaining information of an environment surrounding the vehicle when an obstacle is detected to be on a planning path of the vehicle; obtaining an initial reference velocity profile of the vehicle; determining a safety factor based on the initial reference velocity profile, the information of the environment and information of the vehicle, wherein the safety factor at least includes a safety distance between the vehicle and the obstacle for the vehicle to follow the obstacle; determining an optimized reference velocity profile based on the information of the environment, the information of the vehicle and the safety factor; and performing the step of determining the safety factor by using the optimized reference velocity profile as the initial reference velocity profile and the step of determining the optimized reference velocity iteratively.

According to a fourth aspect of embodiments of the present disclosure, a vehicle is provided. The vehicle may include the apparatus as described above.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

BRIEF DESCRIPTION OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIGS. 4 (a) and (b), FIGS. 5 (a) and (b), FIGS. 6 (a) and (b), and FIG. 7 illustrate examples of a safety distance and an optimized reference velocity profile in a process for controlling the velocity of the autonomous driving vehicle according to embodiments of the present disclosure.

The same reference numbers will be used throughout the drawings to refer to the same or like parts.

DETAILED DESCRIPTION OF THE PREFERRED EMBODIMENTS

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

In this application, the use of the singular includes the plural unless specifically stated otherwise. In this application, the use of "or" means "and/or" unless stated otherwise. Furthermore, the use of the term "including" as well as other forms such as "includes" and "included" is not limiting. In addition, terms such as "element" or "component" encompass both elements and components including one unit, and elements and components that include more than one sub-unit, unless specifically stated otherwise. Additionally, the section headings used herein are for organizational purposes only, and are not to be construed as limiting the subject matter described.

Figure 1:
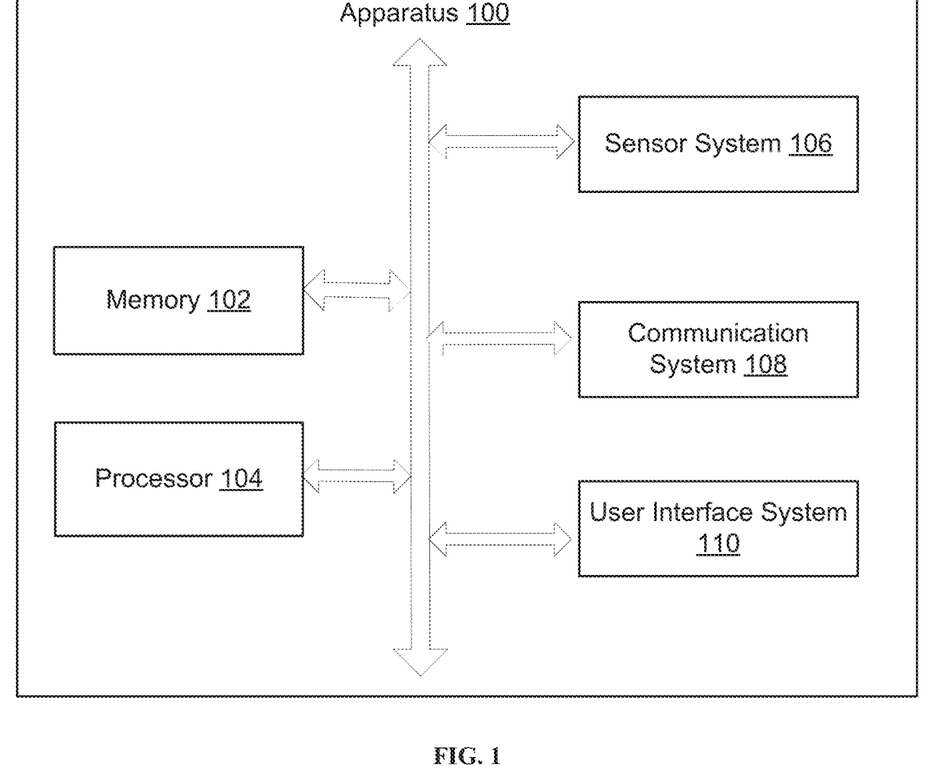
FIG. 1 illustrates a block diagram of an apparatus for controlling a velocity of an autonomous driving vehicle according to one embodiment of the present disclosure.

FIG. 1 illustrates a block diagram of an apparatus 100 according to an embodiment of the present disclosure. The apparatus 100 may be mounted on an autonomous driving vehicle. The autonomous driving vehicle may refer to a vehicle that can be configured to operate in an autonomous driving mode, in which the vehicle navigates through an environment with little or no input from a driver. In some embodiments, the autonomous driving vehicle can also operate in a manual mode or a partial autonomous driving mode.

As depicted in FIG. 1, the apparatus 100 includes a memory 102, a processor 104, a sensor system 106, a communication system 108 and a user interface (UI) system 110. The memory 102, the processor 104, the sensor system 106, the communication system 108 and the UI system 110 are directly or indirectly connected with each other for data and signal transmission or exchange. For example, these components may be electrically connected to each other via one or more communication buses or signal lines, such as a controller area network (CAN) bus.

The apparatus 100 may include at least one program function module in form of software or firmware stored or embedded in the memory 102 and executed by the processor 104. The processor 104 is used for performing executable instructions and programs stored in the memory 102. The memory 102 is used for storing various types of data of the apparatus 100. The memory 102 may be an internal memory of the apparatus 100, or a removable memory. For example, the memory 102 may include, but not be limited to, random access memory (RAM), read only memory (ROM), programmable read-only memory (PROM), erasable read only memory (EPROM), electrically erasable read only memory (EEPROM) and the like.

The processor 104 may be an integrated circuit chip with signal and data processing capability. The processor 104 as described may be a general purpose processor, including a central processor (CPU), a network processor (NP) and etc. The processor 104 can also be a digital signal processor (DSP), application specific integrated circuit (ASIC), Field-programmable gate array (FPGA) or other programmable logic device, discrete gate or transistor logic, discrete hardware components. The processor 104 can execute or implement methods, steps and logic diagrams disclosed in embodiments of the present disclosure. In some embodiments, the processor 104 can generate and/or transmit a variety of communication signals and/or commands (such as, for example, acceleration signals or commands, deceleration signals or commands, steering signals or commands, braking signals or commands, etc.) for controlling an engine, wheels, steering wheel, transmission of the autonomous driving vehicle. For example, by transmitting a variety of commands, the processor 104 can adjust the direction or heading of the vehicle, control the speed of the motor or engine that in turn control the speed and acceleration of the vehicle, and decelerate the vehicle by providing friction to slow the wheels or tires of the vehicle.

The sensor system 106 may include one or more sensors that are configured to detect information about the environment in which the vehicle operates. The vehicle may use the detected information to navigate through the environment. In some embodiments, the sensor system 106 includes, but is not limited to, a camera, a global positioning system (GPS) unit, an inertial measurement unit (IMU), a radar unit, and a light detection and range (LiDAR) unit. In some embodiments, the sensor system 106 may include one or more cameras to capture images of the environment surrounding the autonomous vehicle. The camera may be a still camera or a video camera. The camera may be mechanically movable, for example, by mounting the camera on a rotating and/or tilting platform. In some embodiments, the GPS unit may include a transceiver operable to provide information regarding the position of the autonomous driving vehicle. In some embodiments, the IMU unit may sense position and orientation changes of the autonomous vehicle based on inertial acceleration. In some embodiments, the radar unit may utilize radio signals to sense objects within the local environment of the autonomous driving vehicle, or the radar unit may sense the speed and/or heading of the objects in addition to sensing objects. In some embodiments, the LiDAR unit may sense objects in the environment in which the autonomous driving vehicle is located using lasers. The LiDAR unit may include one or more laser sources, a laser scanner, and one or more detectors, among other system components.

The wireless communication system 108 is configured to communication with external systems, such as devices, sensors, other vehicles, etc. In some embodiments, the wireless communication system 108 can use a cellular communication network or a wireless local area network (WLAN) to communicate with one or more servers. The servers may be any kind of servers or a cluster of servers, such as Web or cloud servers, application servers, backend servers, or a combination thereof. For example, the servers may be a data analytics servers, content servers, traffic information servers, map and point of interest (MPOI) severs, or location servers, etc. In some embodiments, the wireless communication system 108 could communicate directly with a device (e.g., a mobile device of a passenger, a display device, a speaker within the vehicle), for example, using an infrared link, Bluetooth, etc.

The UI system 110 may be part of peripheral devices implemented within the autonomous driving vehicle, including, for example, a keyword, a touch screen display device, a microphone, and a speaker, etc. For example, a user may specify a starting location and a destination of a trip, for example, via the user interface 110. In another example, the autonomous driving vehicle may receive an instruction through the UI system 110 from the user to operate in a manual driving mode, a full autonomous driving mode, or a partial autonomous driving mode.

Figure 2:
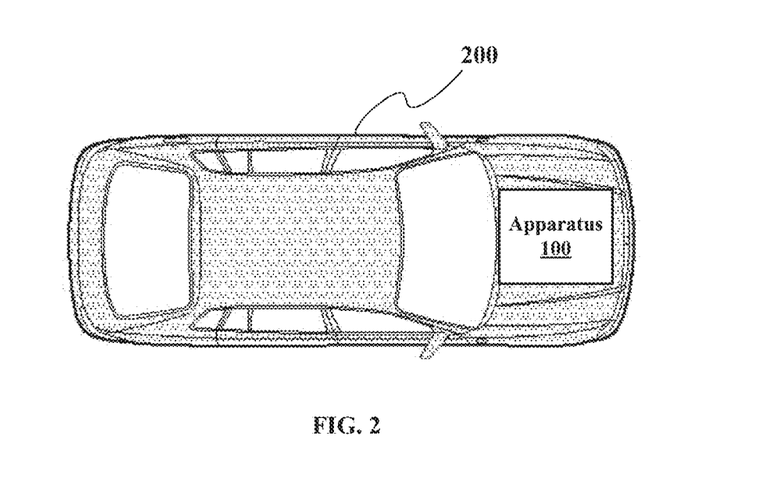
FIG. 2 illustrates a vehicle equipped with the apparatus of FIG. 1.

As shown in FIG. 2, the apparatus 100 may be mounted on a vehicle 200, so as to control a velocity of the vehicle 200. In some embodiments, the vehicle 200 is an autonomous driving vehicle as described above. In some embodiments, besides the apparatus 100, the vehicle 200 may further include certain common components which are included in ordinary vehicles, such as an engine, wheels, steering wheel, transmission, etc., which may be controlled by the apparatus 100 using a variety of communication signals and/or commands, such as acceleration signals or commands, deceleration signals or commands, steering signals or commands, braking signals or commands, etc.

Figure 3:
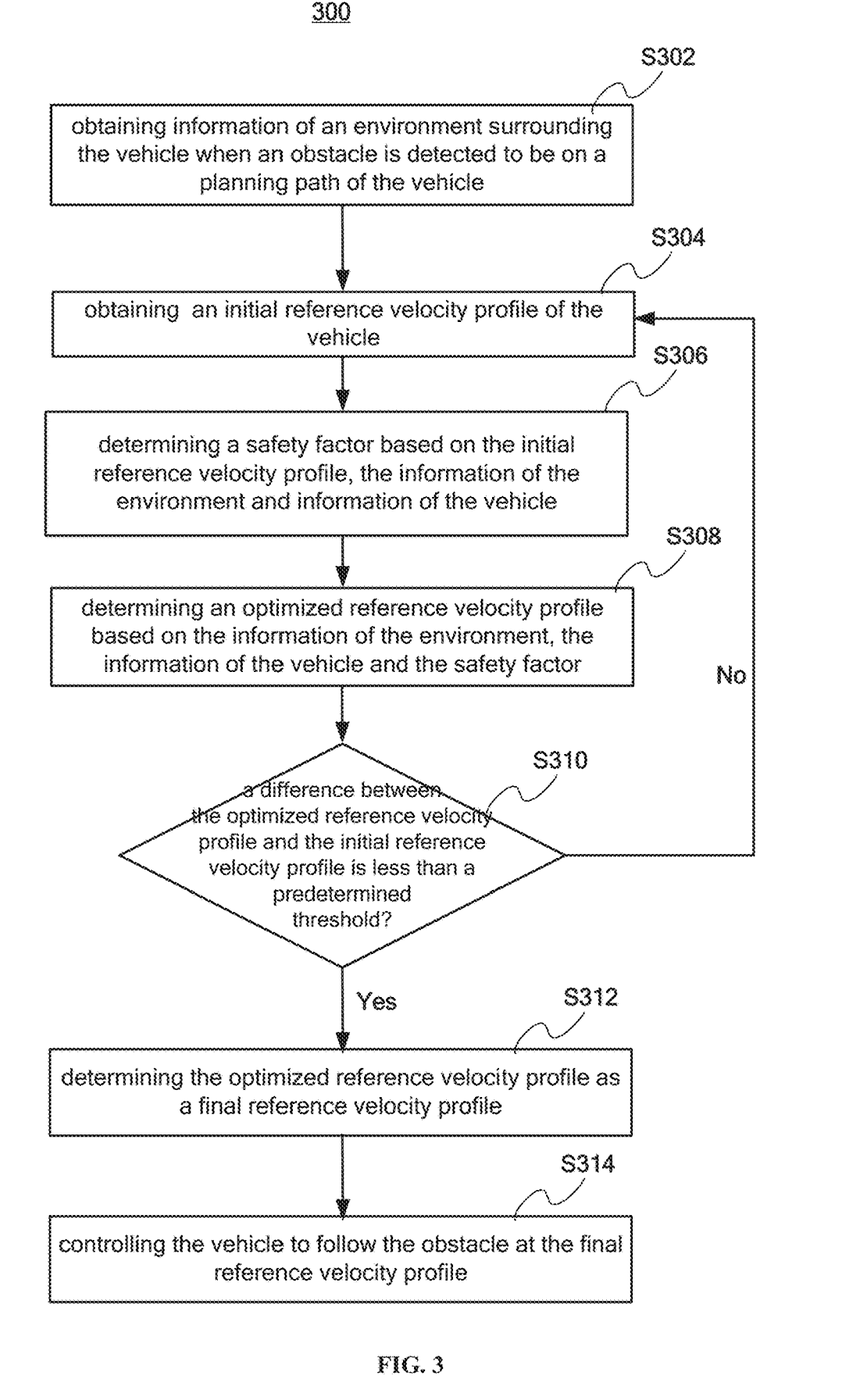
FIG. 3 illustrates a flow chart of a method for controlling a velocity of an autonomous driving vehicle according to one embodiment of the present disclosure.

FIG. 3 is a flow chart of a method 300 for controlling a velocity of an autonomous driving vehicle. In some embodiments, the memory 102 of the apparatus 100 shown in FIG. 1 stores instructions corresponding to the method 300, and by reading and executing the instructions, the processor 104 is caused or configured to perform the steps of the method 300, so as to control a velocity of the autonomous driving vehicle 200 shown in FIG. 2. In some embodiments, the method 300 for controlling a velocity of a vehicle may be referred to as longitudinal planning, speed planning or velocity planning.

As shown in FIG. 3, in Step 302, information of an environment surrounding the vehicle is obtained, when an obstacle is detected to be on a planning path of the vehicle.

In some embodiments, the autonomous driving vehicle may operate in a full autonomous driving mode, and the autonomous driving vehicle may navigate through an environment with little or no input from a driver. In the full autonomous driving mode, the sensor system 106 as shown in FIG. 1 may detect information of the environment surrounding the vehicle, for example, the lane configuration (e.g., straight or curve lanes), traffic light signals, a relative position of another vehicle, a pedestrian, a building, crosswalk, or other traffic related signs (e.g., stop signs, yield signs). The information of the environment can be received and processed by the processor 104 for controlling the vehicle. For example, the processor may process and analyze images captured by one or more cameras of the sensor system 106 in order to identify objects and/or features in the environment of the autonomous driving vehicle. The objects can include traffic signals, road way boundaries, other vehicles, pedestrians, and/or obstacles, etc. The processor 104 may implement an object recognition algorithm, video tracking, and other computer vision techniques to obtain the information of the environment. In some embodiments, the processor 104 may further map the environment, track objects, and estimate the speed of objects, etc. based on the environment information. In some embodiments, the processor 104 may obtain the information of the environment through the communication system 108. For example, the communication system 108 may retrieve a map of the environment from a map server.

Once an obstacle, for example, another vehicle, is detected to be on the planning path of the vehicle, the information of the environment surrounding the vehicle may be obtained and processed by the apparatus to avoid collision.

In some embodiments, the information of the environment includes traffic regulations for the planning path, for example, the speed limit. The traffic regulations are designed by governments for public transportation safety, and such regulations also apply to autonomous driving vehicles. The autonomous driving vehicle should follow traffic regulations at all times. In addition to being a safety requirement, following the traffic regulations will also minimize the risk of accidents and reduce emergency reactions for autonomous driving. In some embodiments, the information of the environment further includes one or more curvatures of the planning path.

In some embodiments, the information of the environment includes information of the obstacle. For example, the information of the obstacle may include a current velocity of the obstacle, a current location of the obstacle, a predicted velocity of the obstacle and a predicted location of the obstacle. In some embodiments, the information of the environment may include a combination of the traffic regulations for the planning path, the curvature of the planning path and the information of the obstacle.

It should be noted that, even different kinds of information of the environment are described above, the present disclosure is not limited thereto, and other information of the environment surrounding the vehicle can be used, for example, traffic signals, road way boundaries, etc.

In Step 304, an initial reference velocity profile of the vehicle is obtained.

In an autonomous driving mode, the vehicle may generate a reference velocity profile for a time period in the future (for example, next 8 seconds, next 10 seconds, etc.). When the vehicle drives according to the reference velocity profile, there should be enough margin for the vehicle to maintain safety during driving. In some embodiments, the reference velocity profile for a future period may be retrieved or calculated and used as the initial reference velocity profile. In other embodiments, the initial reference velocity profile may be set as a constant velocity profile, for example, a profile that has the vehicle to maintain its current velocity in the next 8 seconds.

In some embodiments, certain steps of the method 300 may be iteratively performed to reach an optimal profile. For example, Steps 304-310 of the method 300 mentioned below may be iteratively performed. As such, the initial reference velocity profile may be an optimized reference velocity profile determined in the step 308 which will be detailed below. After determined in step 308, the optimized reference velocity profile may be stored in a memory. Then, in a next round of iteration, the optimized reference velocity profile can be retrieved and used as the initial reference velocity profile for the next round of iteration.

Figure 4:
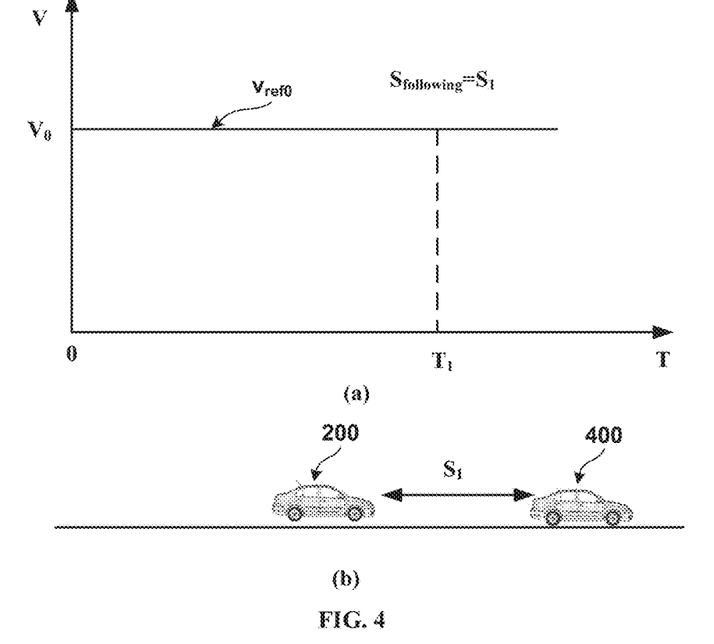

In an example, referring to the FIG. 4 (a), an initial reference velocity profile $v_{ref0}$ of the autonomous driving vehicle 200 is illustrated. The initial reference velocity profile $v_{ref0}$ is a constant velocity profile, that is, the vehicle 200 is initially controlled to drive on the planning path at a constant velocity $V_0$, if the planning path has not been updated or adjusted based on the latest obtained information of the environment. It can be appreciated that, in some other examples, the initial reference velocity profile may be a gradually changing velocity profile (i.e., a smooth curve), because there may be some obstacles (including pedestrians, vehicles, etc.) in the planning path.

In Step 306, a safety factor is determined based on the initial reference velocity profile, the information of the environment and information of the vehicle.

In some embodiments, the safety factor may include various elements, for example, a speed limit, a maximum speed allowed for passing a curved road, a safety distance between the vehicle and the obstacle for the vehicle, etc. In some embodiment, any one or combination of the elements can be used for determining the safety factor.

In some embodiments, the information of the environment may include the lane configuration, traffic light signals, a relative position of another vehicle, a pedestrian, a building, crosswalks, or other traffic related signs (e.g., stop signs, yield signs), which has been described above, and will not be elaborated herein.

In some embodiments, the information of the vehicle includes a current velocity of the vehicle and a current location of the vehicle. In some embodiments, the information of the vehicle may further include the acceleration and/or jerk of the vehicle.

The safety factor can be determined based on the initial reference velocity profile, the information of the environment and information of the vehicle. For example, when the safety factor includes a speed limit, the speed limit may be determined based on the traffic regulations for the planning path, as the autonomous driving vehicle should follow traffic regulations at all times. When the safety factor includes a maximum speed allowed for passing a curved road, the maximum speed may be determined based on the curvature of the planning path, a lateral acceleration limit (V_lateral_max) and/or a maximum acceleration allowed due to a maximum power limit of the vehicle (A_power_max).

In some embodiments, in order to avoid collision with the obstacle, the safety factor may further include a safety distance between the vehicle and the obstacle for the vehicle to follow the obstacle. In some embodiments, the safety distance may be determined by comparing a stopping distance of the ego vehicle with a stopping distance of the front obstacle (if moving). In some embodiments, the safety distance may be padded with more spacing due to the velocity uncertainty, the reaction time etc.

It can be appreciated that two or more elements of the safety factor can be considered for determining the safety factor by weighting them using a predetermined evaluation algorithm.

In an example, referring to the FIG. 4 (b), the safety distance $S_{following}$ between the vehicle 200 and the obstacle 400 for the vehicle 200 to follow the obstacle 400 is illustrated as $S_1$. As can be seen from the description above, the safety distance $S_1$ is related to the initial reference velocity profile $v_{ref0}$. According to the safety distance $S_1$ and the initial reference velocity profile $v_{ref0}$, it can be predicted that vehicle 200 may arrive at the safety distance $S_1$ at the time $T_1$, as shown in FIG. 4(a).

In some embodiments, the following Equation (1) may be used to calculate the safety distance $S_{following}$:

$$S_{following} = \frac{V_{ego} * V_{ego}}{2 a_{ego}} - \frac{V_{obs} * V_{obs}}{2 a_{obs}}, \quad \text{Equation (1)}$$

wherein $S_{following}$ represents the safety distance, $V_{ego}$ represents a velocity of the ego vehicle (for example, the vehicle 200), $a_{ego}$ represents an acceleration/deceleration of the ego vehicle, $V_{obs}$ represents a velocity of the front obstacle (for example, the obstacle 400), and $a_{obs}$ represents a predicted acceleration/deceleration of the front obstacle. As the safety distance $S_{following}$ is calculated based on the velocities and decelerations of the ego vehicle and the front obstacle, even if the front obstacle decelerates with the predicted deceleration until it stops, the ego vehicle can still have enough distance to stop behind the front obstacle.

It should be noted that, Equation (1) is an example in which only the velocity and deceleration of the ego vehicle, and the velocity and deceleration of the front obstacle are considered to determine the safety distance. In other embodiments, more information of the ego vehicle, the front obstacle and the environment may be considered. For example, an object recognition algorithm may be performed to identify whether the front obstacle is a pedestrian, a vehicle, a building or other obstacles. The safety distance may be further determined based on the identity information of the front obstacle. Generally, a safety distance between the ego vehicle and the pedestrian should be greater than that between the ego vehicle and the vehicle. In the embodiment, safety distance is then used as the safety factor. It can be appreciated that other element such as the maximum power limit of the vehicle can be used as the safety factor solely or in combination with any other desired elements.

In Step 308, an optimized reference velocity profile is determined based on the information of the environment, the information of the vehicle and the safety factor.

After the safety factor is determined, the processor 104 can determine the optimized reference velocity profile based on the information of the environment, the information of the vehicle and the safety factor.

In some embodiments, the safety distance between the vehicle and the obstacle may be used to determine the optimized reference velocity profile. For example, the safety distance can be used to determine a final velocity of the vehicle when it arrives at the safety distance. Then, the optimized reference velocity profile can be determined based on the current velocity of the vehicle and the final velocity when the vehicle arrives at the safety distance. It can be appreciated that other element in the safety factor, such as the speed limit, a maximum speed allowed for passing a curved road, can also be used to determine the optimized reference velocity profile. For example, the velocity at any time in the optimized reference velocity profile should not exceed the speed limit specified in the traffic regulations.

In some embodiment, the traffic regulations for the planning path, curvatures of the planning path and/or identity information of the front obstacle are also used to determine the optimized reference velocity profile. For example, when the front obstacle is determined as a pedestrian, the autonomous driving vehicle should slowly approach the safety distance. That is, the acceleration of the vehicle should be small. When the front obstacle is determined as a building, the autonomous driving vehicle can approach the safety distance quickly. That is, compared with the pedestrian, the acceleration in the optimized reference velocity profile of the vehicle approaching the building could be higher.

Figure 5:
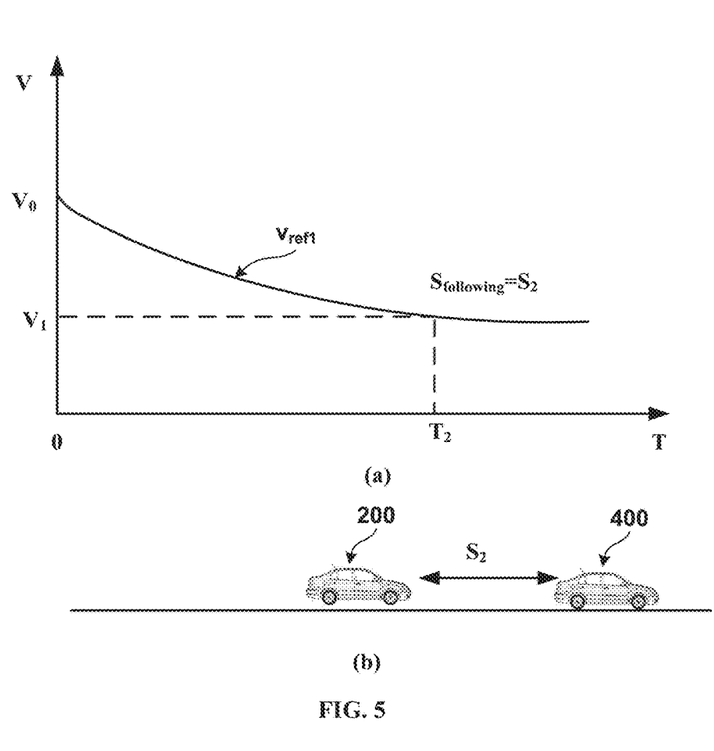

Referring to FIG. 5 (a), an optimized reference velocity profile $v_{ref1}$ is illustrated. As can be seen, the vehicle 200 is controlled to slow down from $V_0$ to $V_1$ (at time $T_2$) to avoid collision with the obstacle 400.

It can be seen that there may be is a difference between the initial reference velocity profile $v_{ref0}$ shown in FIG. 4 (a) and an optimized reference velocity profile $v_{ref1}$ shown in FIG. 5 (a). Such a difference may cause a sudden change of speed of the vehicle in the form of acceleration (or deceleration) during the time period from time 0 to time $T_2$ shown in FIG. 5 (a). In some embodiments, in order to avoid that the change of speed causes discomfort of the passengers, the acceleration of the vehicle may not be suddenly changed in the optimized reference velocity profile. Step 310 provides an algorithm to evaluate whether such difference in reference velocity profile is satisfactory.

Specifically, in Step 310, it is determined whether a difference between the optimized reference velocity profile and the initial reference velocity profile is less than a predetermined threshold.

In some embodiments, one or more velocity values at different times are sampled from the initial reference velocity profile, and the same number of velocity values at these times are also sampled from the optimized reference velocity profile. Then, a norm of differences between the velocity values of the initial reference velocity profile and the velocity values of the optimized reference velocity profile is calculated, and is used as the difference between the optimized reference velocity profile and the initial reference velocity profile. For example, five velocity values $a_1$, $a_2$, $a_3$, $a_4$ and $a_5$ are sampled from the initial reference velocity profile, and five velocity values $b_1$, $b_2$, $b_3$, $b_4$ and $b_5$ are sampled from the optimized reference velocity profile. Then, the norm of the differences between the velocity values of the initial reference velocity profile and the velocity values of the optimized reference velocity profile can be calculated according to the following Equation (2):

$$N = \sqrt{\begin{matrix}(a_1 - b_1)^2 + (a_2 - b_2)^2 + (a_3 - b_3)^2 + \\ (a_4 - b_4)^2 + (a_5 - b_5)^2\end{matrix}}, \quad \text{(Equation 2)}$$

wherein N represents the norm of the differences between the velocity values of the initial reference velocity profile and the velocity values of the optimized reference velocity profile. It can be appreciated that, in some other embodiments, other number of velocity values can be sampled from the initial reference velocity profile and the optimized reference velocity profile.

In some other embodiments, the velocities when the vehicle arrives at the safety distance are determined in the initial reference velocity profile and the optimized reference velocity profile, and then a different between these two velocities is calculated, and is used as the difference between the optimized reference velocity profile and the initial reference velocity profile.

If the difference between the optimized reference velocity profile and the initial reference velocity profile is less than the predetermined threshold, indicating that the optimized reference velocity profile is satisfactory, the method goes to Step 312. If the difference between the optimized reference velocity profile and the initial reference velocity profile is equal to or greater than the predetermined threshold, indicating that the optimized reference velocity profile is unsatisfactory, the method goes back to Step 304 for a further round of iteration. In some embodiments, the predetermined threshold is 5%, 10%, or 15% of the current velocity in the initial reference velocity profile. It should be noted that, the predetermined threshold may vary in different application scenarios. In some embodiments, the predetermined threshold may be configured based on acceleration values in view of simulated feelings of passengers under such acceleration values.

In the embodiment shown in FIG. 5 (a), the vehicle 200 is controlled to slow down to avoid collision with the obstacle 400. As discussed above, the safety distance is related to the reference velocity. That is, the safety distance may change as the reference velocity changes. If the difference between the optimized reference velocity profile $v_{ref1}$ and the initial reference velocity profile $v_{ref0}$ is equal to or greater than the predetermined threshold, it indicates that the optimized reference velocity profile may cause discomfort of the passengers of the autonomous driving vehicle. Thus, the method goes back to Step 304, and then Step 304, Step 306 and Step 308 are iteratively performed until the difference between the optimized reference velocity profile $v_{ref1}$ and the initial reference velocity profile $v_{ref0}$ is less than the predetermined threshold. When the Step 306 and Step 308 are iteratively performed, the optimized reference velocity profile obtained in Step 308 of a previous round of iteration may be used as the initial reference velocity profile of Step 306 of a current round of iteration.

Figure 6:
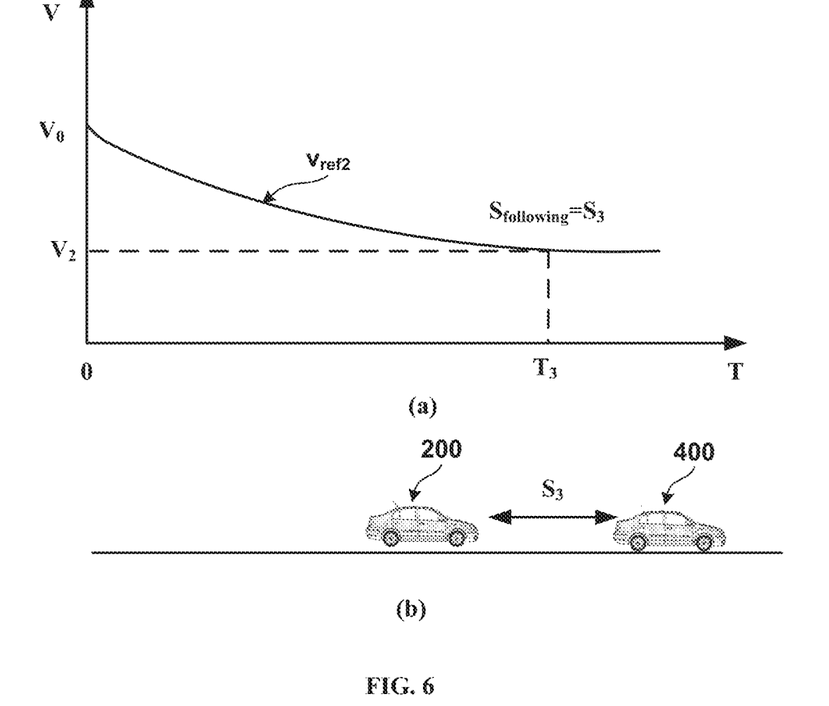

In a second round of iteration, as shown in FIG. 5 (b), the safety distance $S_{following}$ between the vehicle 200 and the obstacle 400 for the vehicle 200 to follow the obstacle 400 is determined as $S_2$ based on the optimized reference velocity profile $v_{ref1}$, the information of the environment and the information of the vehicle. As the initial reference velocity profile $v_{ref0}$ is reduced to the optimized reference velocity profile $v_{ref1}$, the velocity of the vehicle arriving at the safety distance is reduced from $V_0$ to $V_1$. Consequently, the safety distance may be reduced from $S_1$ to $S_2$. As the safety distance reduces, there may be more margin for the autonomous driving vehicle to optimize the reference velocity profile. Subsequently, according to the safety distance $S_2$ and the optimized reference velocity profile $v_{ref1}$, it can be predicted that vehicle 200 may arrive at the safety distance $S_2$ at the time $T_2$ as shown in FIG. 5 (a). Then an optimized reference velocity profile $v_{ref2}$ may be determined based on the information of the environment, the information of the vehicle and the safety distance $S_2$. An example of the optimized reference velocity profile $v_{ref2}$ is shown in FIG. 6 (a). Then, a difference between the optimized reference velocity profile $v_{ref2}$ and the initial reference velocity profile $v_{ref1}$ is determined. If the difference between the optimized reference velocity profile $v_{ref2}$ and the initial reference velocity profile $v_{ref1}$ is less than the predetermined threshold, the method goes to Step 312. If the difference between the optimized reference velocity profile $v_{ref2}$ and the initial reference velocity profile $v_{ref1}$ is equal to or greater than the predetermined threshold, the method goes back to Step 304, and a third round of iteration may be performed.

Figure 7:
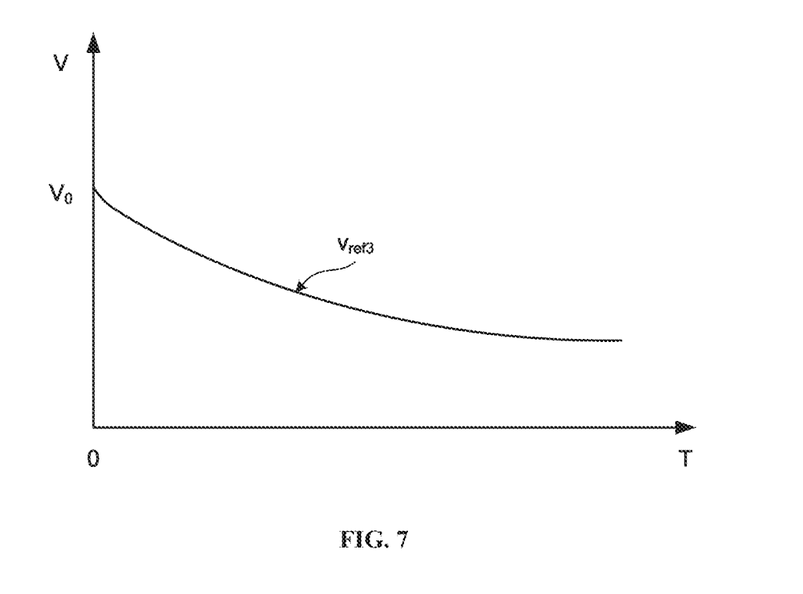

In the third round of iteration, as shown in FIG. 6 (b), the safety distance $S_{following}$ between the vehicle 200 and the obstacle 400 for the vehicle 200 to follow the obstacle 400 is determined as $S_3$ based on the optimized reference velocity profile $v_{ref2}$, the information of the environment and the information of the vehicle. According to the safety distance $S_3$ and the optimized reference velocity profile $v_{ref2}$, it can be predicted that vehicle 200 may arrive at the safety distance $S_3$ at the time $T_3$ as shown in FIG. 6 (a). Similarly, as the reference velocity profile $v_{ref1}$ is reduced to the reference velocity profile $v_{ref1}$, the velocity of the vehicle arriving at the safety distance is reduced from $V_1$ to $V_2$. Consequently, the safety distance may be reduced from $S_2$ to $S_3$. As the safety distance reduces, there may be more margin for the autonomous driving vehicle to further optimize the reference velocity profile. Subsequently, an optimized reference velocity profile $v_{ref3}$ may be determined based on the information of the environment, the information of the vehicle and the safety distance $S_3$. An example of the optimized reference velocity profile $v_{ref3}$ is shown in FIG. 7. Then, it is determined whether a difference between the optimized reference velocity profile $v_{ref3}$ and the initial reference velocity profile $v_{ref2}$ is less than a predetermined threshold. If the difference between the optimized reference velocity profile $v_{ref3}$ and the initial reference velocity profile $v_{ref2}$ is less than the predetermined threshold, the method goes to Step 312. If the difference between the optimized reference velocity profile $v_{ref3}$ and the initial reference velocity profile $v_{ref2}$ is equal to or greater than the predetermined threshold, the method goes back to Step 304, and a fourth round of iteration may be performed. The fourth round or a further round of iteration can be performed as the second and third round of iteration, and is not elaborated herein.

If the difference between the optimized reference velocity profile and the initial reference velocity profile is determined to be less than the predetermined threshold, the method goes to Step 312. In Step 312, the optimized reference velocity profile is determined as a final reference velocity profile. For example, if the difference between the optimized reference velocity profile $v_{ref3}$ and the initial reference velocity profile $v_{ref2}$ is determined to be less than the predetermined threshold, the optimized reference velocity profile $v_{ref3}$ is determined as a final reference velocity profile.

Then, after the optimized reference velocity profile $v_{ref3}$ is determined, Step 314 may be performed. In Step 314, the vehicle is controlled to follow the obstacle at the final reference velocity profile.

It can be seen that a number of iteration on the calculation of the optimized reference velocity profile may be conducted because the safety factor, or specifically in the above example the safety distance, may change with the calculated optimized reference velocity profile, which in turn may affect the calculation of the optimized reference velocity profile.

It should be noted that, in some application scenarios, the difference between the optimized reference velocity profile and the initial reference velocity profile should be less than the predetermined threshold after two or three round of iteration. Thus, in these application scenarios, the step of determining the safety distance and the step of determining the optimized reference velocity profile can be iteratively performed two or three times to obtain the final reference velocity profile. That is, Step 310 of the method 300 can be omitted in these application scenarios.

According to embodiments of the present disclosure, when the autonomous driving vehicle encounters a sudden change of a front obstacle's state, the reference velocity profile for the time period in the future (for example, next 8 seconds, next 10 seconds, etc.) can be timely adjusted to the final reference velocity profile. When the autonomous driving vehicle drives according to the final reference velocity profile to stop at or follow the obstacle, the sharp velocity change or unnecessary hard brake due to sudden change of the front environment can be reduced. Further, it is fast for the method of the present disclosure to converge to the final result after a few iteration (in dozen of millisecond) and therefore the planned velocity is able to resist sudden change.

It should be noted that, the apparatus and methods disclosed in the embodiments of the present disclosure can be implemented by other ways. The aforementioned apparatus and method embodiments are merely illustrative. For example, flow charts and block diagrams in the figures show the architecture and the function operation according to a plurality of apparatus, methods and computer program products disclosed in embodiments of the present disclosure. In this regard, each frame of the flow charts or the block diagrams may represent a module, a program segment, or portion of the program code. The module, the program segment, or the portion of the program code includes one or more executable instructions for implementing predetermined logical function. It should also be noted that in some alternative embodiments, the function described in the block can also occur in a different order as described from the figures. For example, two consecutive blocks may actually be executed substantially concurrently. Sometimes they may also be performed in reverse order, depending on the functionality. It should also be noted that, each block of the block diagrams and/or flow chart block and block combinations of the block diagrams and/or flow chart can be implemented by a dedicated hardware-based systems execute the predetermined function or operation or by a combination of a dedicated hardware and computer instructions.

If the functions are implemented in the form of software modules and sold or used as a standalone product, the functions can be stored in a computer readable storage medium. Based on this understanding, the technical nature of the present disclosure, part contributing to the prior art, or part of the technical solutions may be embodied in the form of a software product. The computer software product is stored in a storage medium, including several instructions to instruct a computer device (may be a personal computer, server, or network equipment) to perform all or part of the steps of various embodiments of the present. The aforementioned storage media include: U disk, removable hard disk, read only memory (ROM), a random access memory (RAM), floppy disk or CD-ROM, which can store a variety of program codes.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the invention disclosed herein. It is intended, therefore, that this disclosure and the examples herein be considered as exemplary only, with a true scope and spirit of the invention being indicated by the following listing of exemplary claims.

What is claimed is:

1. A method for controlling a velocity of an autonomous driving vehicle, comprising steps of:
   obtaining information of an environment surrounding the vehicle when an obstacle is detected to be on a planning path of the vehicle;
   obtaining an initial reference velocity profile of the vehicle;
   determining a safety factor based on the initial reference velocity profile, the information of the environment and information of the vehicle, wherein the safety factor at least comprises a safety distance between the vehicle and the obstacle for the vehicle to follow the obstacle;
   determining an optimized reference velocity profile based on the information of the environment, the information of the vehicle and the safety factor; and
   performing the step of determining the safety factor by using the optimized reference velocity profile as the initial reference velocity profile and the step of determining the optimized reference velocity iteratively,
   wherein the step of performing the step of determining the safety factor and the step of determining the optimized reference velocity iteratively comprises:
   determining whether a difference between the optimized reference velocity profile and the initial reference velocity profile is less than a predetermined threshold; and
   determining the optimized reference velocity profile as a final reference velocity profile if the difference between the optimized reference velocity profile and the initial reference velocity profile is less than the predetermined threshold;
   and controlling the autonomous driving vehicle based on the determined final reference velocity profile.

2. The method of claim 1, wherein an acceleration of the vehicle is continuously changed in the determined optimized reference velocity profile.

3. The method of claim 1, wherein the information of the environment comprises traffic regulations for the planning path, a curvature of the planning path, information of the obstacle or a combination thereof.

4. The method of claim 3, wherein the information of the obstacle comprises a current velocity of the obstacle, a current location of the obstacle, a predicted velocity of the obstacle and a predicted location of the obstacle.

5. The method of claim 1, wherein the information of the vehicle comprises a current velocity of the vehicle and a current location of the vehicle.

6. The method of claim 1, wherein the step of determining the safety factor and the step of determining the optimized reference velocity profile are iteratively performed two or three times to obtain a final reference velocity profile.

7. The method of claim 6, further comprising a step of:
controlling the vehicle to follow the obstacle at the final reference velocity profile.

8. The method of claim 1, wherein the safety factor further comprises a maximum speed due to a curvature of the planning path.

9. An apparatus for controlling a velocity of an autonomous driving vehicle, comprising:
a processor; and
a memory for storing instructions executable by the processor;
wherein the processor is configured to perform steps of:
obtaining information of an environment surrounding the vehicle when an obstacle is detected to be on a planning path of the vehicle;
obtaining an initial reference velocity profile of the vehicle;
determining a safety factor based on the initial reference velocity profile, the information of the environment and information of the vehicle, wherein the safety factor at least comprises a safety distance between the vehicle and the obstacle for the vehicle to follow the obstacle;
determining an optimized reference velocity profile based on the information of the environment, the information of the vehicle and the safety factor; and
performing the step of determining the safety factor by using the optimized reference velocity profile as the initial reference velocity profile and the step of determining the optimized reference velocity iteratively,
wherein the step of performing the step of determining the safety factor and the step of determining the optimized reference velocity iteratively comprises:
determining whether a difference between the optimized reference velocity profile and the initial reference velocity profile is less than a predetermined threshold; and
determining the optimized reference velocity profile as a final reference velocity profile if the difference between the optimized reference velocity profile and the initial reference velocity profile is less than the predetermined threshold;
and controlling the autonomous driving vehicle based on the determined final reference velocity profile.

10. The apparatus of claim 9, wherein an acceleration of the vehicle is continuously changed in the determined optimized reference velocity profile.

11. The apparatus of claim 9, wherein the information of the environment comprises traffic regulations for the planning path, a curvature of the planning path, information of the obstacle or a combination thereof.

12. The apparatus of claim 11, wherein the information of the obstacle comprises a current velocity of the obstacle, a current location of the obstacle, a predicted velocity of the obstacle and a predicted location of the obstacle.

13. The apparatus of claim 9, wherein the information of the vehicle comprises a current velocity of the vehicle and a current location of the vehicle.

14. The apparatus of claim 9, wherein the processor is configured to iteratively perform the step of determining the safety factor and the step of determining the optimized reference velocity profile two or three times to obtain a final reference velocity profile.

15. The apparatus of claim 14, wherein the processor is further configured to perform a step of: controlling the vehicle to follow the obstacle at the final reference velocity profile.

16. The apparatus of claim 9, wherein the predetermined threshold is 5%, 10%, or 15% of the initial reference velocity profile.

17. The apparatus of claim 9, wherein the safety factor further comprises a maximum speed due to a curvature of the planning path.

18. A non-transitory computer-readable storage medium having stored therein instructions that, when executed by a processor, cause the processor to perform a method for controlling a velocity of an autonomous driving vehicle, wherein the method comprises steps of:
obtaining information of an environment surrounding the vehicle when an obstacle is detected to be on a planning path of the vehicle;
obtaining an initial reference velocity profile of the vehicle;
determining a safety factor based on the initial reference velocity profile, the information of the environment and information of the vehicle, wherein the safety factor at least comprises a safety distance between the vehicle and the obstacle for the vehicle to follow the obstacle;
determining an optimized reference velocity profile based on the information of the environment, the information of the vehicle and the safety factor; and
performing the step of determining the safety factor by using the optimized reference velocity profile as the initial reference velocity profile and the step of determining the optimized reference velocity iteratively,
wherein the step of performing the step of determining the safety factor and the step of determining the optimized reference velocity iteratively comprises:
determining whether a difference between the optimized reference velocity profile and the initial reference velocity profile is less than a predetermined threshold; and
determining the optimized reference velocity profile as a final reference velocity profile if the difference between the optimized reference velocity profile and the initial reference velocity profile is less than the predetermined threshold;
and controlling the autonomous driving vehicle based on the determined final reference velocity profile.

* * * * *